United States Patent Office 3,804,829
Patented Apr. 16, 1974

3,804,829
DIAZIRIDINONES
Frederick D. Greene, 25 Canterbury Road, Winchester,
Mass. 01890
No Drawing. Continuation of applications Ser. No.
713,305, Mar. 15, 1968, and Ser. No. 482,932, Aug.
26, 1965, both now abandoned. This application Jan.
11, 1972, Ser. No. 217,043
Int. Cl. C07d 45/00
U.S. Cl. 260—239 AA          5 Claims

ABSTRACT OF THE DISCLOSURE

The preparation, reactions and uses of the diaziridinones, a new class of small ring heterocycles, are described in detail. Structurally, these diaziridinones are 2,3-diazacyclopropanones which are characterized by the formula

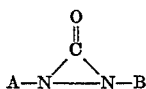

in which A and B each represent an organic substituent which is attached to the respective nitrogen atoms of the diaziridinone through a tertiary carbon atom and which is selected from the group consisting of (a) alkyl groups, (b) alkenyl groups, (c) alkynyl groups, (d) aralkyl groups, and (e) substituted-alkyl, -alkenyl, -alkynyl, and -aralkyl groups containing within the structure of such substituent at least one functional group which is unreactive with respect to the diaziridinone ring and which is selected from the group of functional groups consisting of tertiary amines, pyridines, quinolines, aldehydes, ketones, esters, lactones, carbonates, halides, ethers, nitro groups azo groups, nitriles, sulfones, anhydrides, amides, N,N-dialkylamides, N-alkylamides, N-arylamides, N-acylamines, N-oxides, sulfonamides, sulfides, sulfoxides, epoxides, and isocyanates.

The diaziridinone ring is reactive towards acids, towards nucleophiles that are easily oxidized, and towards strong nucleophiles, on the basis of which reactivity the diaziridinones may be used as intermediates in the preparation of N,N'-disubstituted hydrazines (which, in turn, are useful in the preparation of dyestuffs, pharmaceuticals and insecticides), or as curing agents, blowing agents and as free radical initiators in connection with various polymerization reactions and polymer systems.

CROSS-REFERENCE TO RELATED APPLICATION

This application is a continuation of application Ser. No. 713,305 filed Mar. 15, 1968, now abandoned, and application Ser. No. 482,932, filed Aug. 26, 1965, now abandoned.

The invention relates to a new class of small ring heterocycles, the diaziridinones or 2,3-diazacyclopropanones, which are very reactive towards acids, towards nucleophiles that are easily oxidized, and towards strong nucleophiles, on the basis of which reactivity these diaziridinones may be used as synthetic intermediates in the preparation of dyestuffs, pharmaceuticals and insecticides, or as curing agents, blowing agents, and as free radical initiators in connection with various polymerization reactions and polymer systems.

Structurally, the diaziridinones of the invention are characterized by the formula

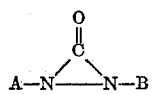

in which A and B each represent an organic substituent which is attached to the respective nitrogen atoms of the diaziridinone through a tertiary carbon atom and which is selected from the group consisting of (a) alkyl groups, (b) alkenyl groups, (c) alkynyl groups, (d) aralkyl groups, and (e) substituted-alkyl, -alkenyl, -alkynyl, and -aralkyl groups containing within the structure of such substituent at least one functional group which is unreactive with respect to the diaziridinone ring and which is selected from the group of functional groups consisting of tertiary amines, pyridines, quinolines, aldehydes, ketones, esters, lactones, carbonates, halides, ethers, nitro groups, azo groups, nitriles, sulfones, anhydrides, amides, N,N-dialkylamides, N-alkylamides, N-arylamides, N-acylamines, N-oxides, sulfonamides, sulfides, sulfoxides, epoxides, and isocyanates.

PREPARATION OF THE DIAZIRIDINONES

The principal method of synthesis of the diaziridinones is based on halogenating an N,N'-disubstituted urea (1) to form an N,N'-disubstituted-N-halourea (II) which may be dehydrohalogenated and cyclized in the presence of base to form the diaziridinone (III) in accordance with the following reaction sequence:

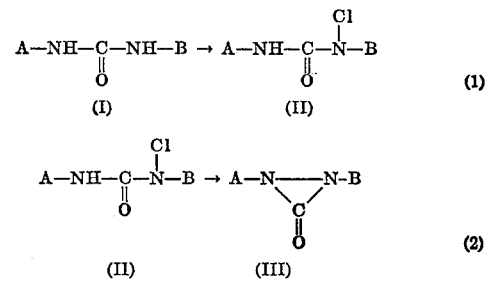

Chemical evidence in support of structure III is found in (a) cleavage of the N—N bond by hydrogenation (palladium on carbon) with the formation of the corresponding N,N'-disubstituted urea (I) in good yields, and (b) cleavage of the C—N bond by sodium borohydride with the formation of N,N'-disubstituted-N-formylhydrazine.

A large number of halogenation agents may be used to form the intermediate N,N'-disubstituted-N-halourea (II), among which one of the most efficient compounds was found to be t-butyl hypochlorite. By way of illustration, the chlorination of N,N'-di-t-butylurea with t-butyl hypochlorite yields N,N'-di-t-butyl-N-chlorourea. Treatment of N,N'-di-t-butyl-N-chlorourea with a base, such as potassium t-butoxide or potassium metal, leads to di-t-butyldiaziridinone.

This synthetic technique (halogenation of the N,N'-disubstituted urea followed by the reaction of a base or the resultant N-halourea) may be used to prepare any diaziridinone (III) from the corresponding N,N'-disubstituted urea (I) provided that the substituents A and B are either (1) unreactive towards the halogenating agent (R—O—Cl) and the base (R—O—), or (2) less reactive towards these reagents than the urea is towards R—O—Cl and the N-chlorourea is towards the alkoxide. Consequently, these substituents may be present during the reaction sequence of urea→N-chlorourea→diaziridinone. Among such substituents are (a) alkyl groups, (b) alkenyl groups, (c) aralkyl groups, and (d) substituted-alkyl, -alkenyl and -aralkyl groups containing one or more functional groups which are unreactive toward the halogenating agent and the base used to react with the N-halourea to form the diaziridinone. Among such functional groups are tertiary amines, pyridines, quinolines, aldehydes, ketones, esters, lactones, carbonates, halides (alkyl halides or aryl halides), ethers, nitro groups, azo groups, nitriles, sulfones, and N,N-dialkylamides.

As a general rule, certain functional groups should be introduced into the organic substituents A and B after the formation of the diaziridinone. These functional groups include anhydrides, N-alkylamides, N-arylamides, N-acylamines, amides, sulfonamides, sulfides, sulfoxides, acetylenes, allenes, epoxides, ketones and isocyanates.

Using the principal synthetic technique of chlorination of the N,N'-disubstituted urea followed by an alkoxide-induced dehydrochlorination of the N-chlorourea, a large number of diaziridinones have been prepared, including di-t-butyldiaziridinone, di-t-amyldiaziridinone, di-t-octyldiaziridinone, di-(2,2,1-bicycloheptyl)diaziridinone, as well as those diaziridinones characterized by the structure in

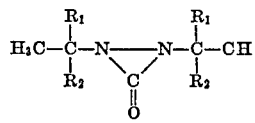

which $R_1$ may be an alkyl group, such as methyl and ethyl and $R_2$ may be phenyl, benzyl, and halogen-substituted and alkoxy-substituted phenyl and benzyl groups. Moreover, unsymmetrical N,N'-disubstituted diaziridinones may also be prepared by this technique, which has been used for forming N-t - butyl-N' - (methylethylphenylcarbinyl) diaziridinone, N-t-butyl-N'-t-octyldiaziridinone, N-t-octyl-N'-(1,1-dimethyl-2-phenyl-ethyl)diaziridinone, N - t-octyl-N-(1,1-diethylpropyl)diaziridinone, and N-t-octyl-N'-adamantyldiaziridinone.

Table I lists representative examples of additional diaziridinones which may be prepared.

TABLE I

Substituted-t-alkyl Diaziridinones (1) Bis[1,1-dimethyl-(p-N,N-dimethyl-carboxamidophenyl)carbinyl]-diaziridinone
(2) Bis[1,1-dimethyl-(p-N,N-dimethyl-sulfonamidophenyl)carbinyl]-diaziridinone
(3) Bis[1,1-diethyl-(4-pyridyl)carbinyl]-diaziridinone
(4) Bis{1,1-dimethyl-[2-(5-cyanomethyl)furyl]carbinyl}-diaziridinone
(5) Bis{1-(4-diethylamino)bicyclo[2.2.2]octyl}diaziridinone
(6) Bis[1,1-dimethyl-(p-2-oxacyclopropylphenyl)carbinyl]-diaziridinone
(7) Bis-2-(2,6-dimethyl-hept-6-enyl)-diaziridinone
(8) Bis-1-(1-methyl-7-nitrotetralyl)-diaziridinone
(9) Bis-1-(cis-1-methyl-4-carbomethoxy cyclohexyl)-diaziridinone
(10) N-1-methylcyclobutyl-N'-(1,1-dimethyl-2-phenylethyl)-diaziridinone
(11) N-1-(4-isocyanatobicyclo[2.2.2]octyl)-N'-t-butyl-diaziridinone
(12) N-(1-dimethyl-p-nitrophenylcarbinyl)-N'-t-butyl-diaziridinone
(13) N-[1,1-dimethyl-(p-methylsulfonyl)phenylcarbinyl]-N'-triethylcarbinyl-diaziridinone
(14) N-[1,1-dimethyl-2-(meta-trifluoromethylphenyl)ethyl]-N'-t-octyl-diaziridinone
(15) N-[1,1-dimethyl-(p-morpholinomethyl)phenylcarbinyl]-N'-t-butyl-diaziridinone

THE CHEMISTRY OF THE DIAZIRIDINONE RING

The diaziridinone ring is quite reactive towards acids but relatively unreactive towards nucleophiles. Strong nucleophiles, such as primary alkyl amines and unhindered alkoxides, attack the carbonyl group of the diaziridinone ring and cause ring opening. The diaziridinones undergo an unusual oxidation/reduction reaction with nucleophiles that are easily oxidized, such as phenols, alkyl hydrazines, enols and mercaptans, with concomitant reduction of the diaziridinone to the N,N'-disubstituted urea.

Apart from these reactions, the diaziridinone ring is very stable for a strained, small-ring compound. For example, the diaziridinone ring is (a) unreactive towards the carbonyl group, such as aldehydes, ketones, esters, lactones, carbonates, anhydrides, amides, and ureas, (b) unreactive towards heterocumulenes, such as isocyanates, ketenes, and carbodiimides, (c) unreactive towards carbon-carbon unsaturation, such as olefins, acetylenes, and allenes, (d) unreactive towards epoxides, (e) unreactive towards alkyl or aryl halides, (f) unreactive towards alkyl or aryl ethers, (g) unreactive towards nitriles, isonitriles, nitro groups, azo groups, and nitroso groups, (h) unreactive towards amine oxides, and (i) unreactive towards sulfoxides, sulfones, sulfonamides, sulfides and disulfides. Consequently, the tertiary substituents attached to the respective nitrogen atoms of the diaziridinone ring may contain one or more of the foregoing functional groups, all of which are unreactive with respect to the diaziridinone ring.

The reactivity of the diaziridinone ring towards heat, acids, strong nucleophiles, and oxidizable nucleophiles is the basis on which the diaziridinones may be used commercially. Because a better understanding of the chemistry of the diaziridinone ring will facilitate an understanding of the wide range of uses for diaziridinones, the reactivity of the diaziridinone ring towards heat, acids, strong nucleophiles, and oxidizable nucleophiles, is described in detail below.

Effect of heat.—Upon pyrolysis, di-t-butyldiaziridinone decomposes (at 180° C.) to liberate carbon monoxide, nitrogen, isobutylene, isobutane, t-butyl isocyanate, and di-t-butylurea. The amount of gaseous products liberated is quite considerable.

Reactivity towards acids.—Treatment of di-t-butyldiaziridinone with dry hydrogen chloride followed by water yields 2,3-di-t-butylcarbazyl chloride which may be reconverted back to the diaziridinone by addition of potassium t-butoxide. With a carboxylic acid, such as benzoic acid, the diaziridinone (III) reacts to form the acyl carbazate (IV) which, in turn, may be rearranged by heat to the monoacyl hydrazine (V) in accordance with the following reactions:

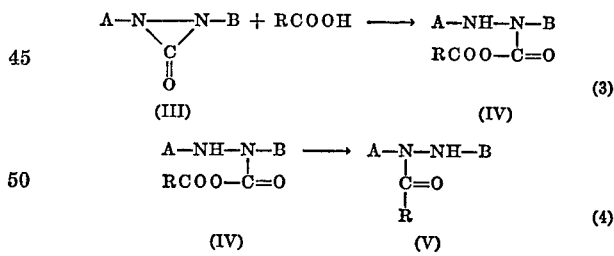

Reactivity towards strong nucleophiles.—Strong nucleophiles, such as primary alkyl amines and unhindered alkoxides, attack the carbonyl group of the diaziridinone ring and cause ring opening. For example, nucleophilic attack by an alkoxide ion (which is formed by the inclusion of a base in an alkanol) on the diaziridinone (III) yields an alkyl 2,3-disubstituted carbazate (VI) in accordance with the following reaction:

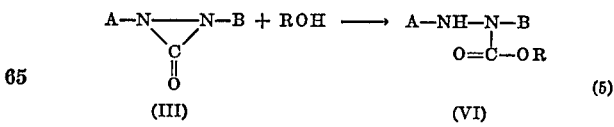

The diaziridinones are remarkably stable even in refluxing alkanols; when a small amount of sodium methoxide is added to methanol containing the diaziridinone, the three-membered ring of the diaziridinone opens to form the methyl 2,3-disubstituted carbazate. Similarly, refluxing the diaziridinone in t-butyl alcohol in the presence of potassium t-butoxide results in the formation of the t-butyl 2,3-disubstituted carbazate.

Nucleophilic attack by a primary alkyl amine on the diaziridinone (III) yields the semicarbazide (VII) which, in turn, suffers further attack to form the dialkylurea (VIII) and the N,N''-disubstituted hydrazine (IX) in accordance with the following reactions:

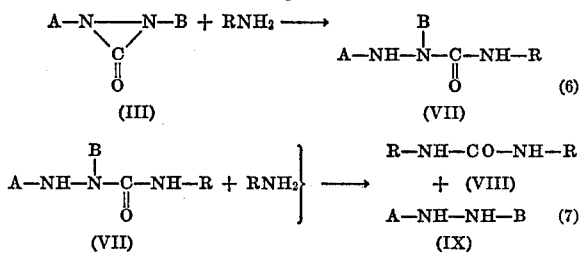

Oxidation/reduction reactions.—Certain nucleophiles and diaziridinones undergo an oxidation-reduction reaction in which the nucleophile is oxidized and the diaziridinone is reduced to the corresponding urea. This unusual reaction occurs with those nucleophiles that are easily oxidized, among which nucleophiles are phenols, mercaptans, alkyl hydrazines and enols.

As a general rule, phenols undergo reaction with a diaziridinone to form the corresponding phenoxy free radical which, of course, may undergo further reaction. For example, 2,4,6-tri-t-butylphenol reacts with di-t-butyldiaziridinone to form the 2,4,6-tri-t-butylphenoxy free radical and 1,3-di-t-butylurea. Phenol and catechol are each oxidized by di-t-butyldiaziridinone to the respective phenoxy and catechoxy free radicals which autopolymerize in the absence of any polymerization substrate.

Diaziridinones react with mercaptans in a simultaneous oxidation-reduction reaction in which the mercaptan groups (—SH) oxidize to form a disulfide linkage (—SS—) and the diaziridinone is reduced to its corresponding urea.

USES OF THE DIAZIRIDINONES

Because of the unusual chemical properties of the diaziridinone ring, the diaziridinones of the invention are quite useful as synthetic intermediates for the preparation of tertiary N,N'-disubstituted hydrazines (which, in turn, are valuable intermediates in the preparation of certain dyestuffs, pharmaceuticals and insecticides) or they may be used in connection with various polymerization reactions. Several examples of such uses are described below:

Use in preparation of tertiary N,N'-disubstituted hydrazines.—The syntheses of N,N'-disubstituted hydrazines have occupied the attention of many organic chemists, since these compounds are important intermediates for the preparation of dyestuffs, pharmaceuticals and insecticides. Although the primary and secondary N,N'-disubstituted hydrazines are accessible from the corresponding azines, it is very difficult to form tertiary N,N'-disubstituted hydrazines. Alkylation of hydrazine is unsatisfactory, since it yields a complex mixture of mono-substituted and disubstituted hydrazines.

Tertiary N,N'-disubstituted hydrazines may be prepared in high yields, however, by first reacting a diaziridinone (III) with an alkanol in the presence of base to form the corresponding alkyl 2,3-disubstituted carbazate (IV) as shown in Equation 3 above.

The alkyl 2,3-disubstituted carbazate (IV) is readily cleaved by an acid, such as hydrogen chloride, to form the corresponding tertiary N,N'-disubstituted hydrazine (IX) in accordance with the following reaction

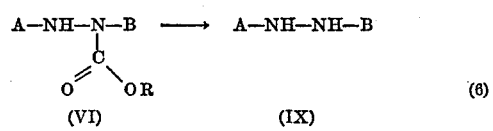

Moreover, the carbazate need not be isolated but may be formed in situ by refluxing the diaziridinone in an alkanol in the presence of a catalytic amount of a base and the resultant reaction mixture made acidic by addition of hyrogen chloride (or an acid), under which conditions decarboxylation of the carbazate to the corresponding N,N'-disubstituted hydrazine occurs.

Use as blowing agents.—Since certain diaziridinones (such as di-t-butyl-diaziridinone and bis(1,1-dimethyl-2-phenylethyl)di-aziridinone) liberate gaseous products only at relatively high temperatures, these diaziridinones may be used as high temperature blowing agents for polyurethanes, polycarbonates, polypropylene, polyethylene, polystyrene and copolymers, as well as nylon-type polymers.

Use as curing agent.—The simultaneous oxidation-reaction between mercaptans and diaziridinones may be used in the curing of the liquid meraptan-terminated polymers. By incorporating a wax-encapsulated diaziridinone in a liquid polysulfide polymer, it is possible to ship and store the resultant polysulfide composition in one package without any reaction. Upon warming the system so that the wax surrounding the diaziridinone melts, the diaziridinone is exposed to the mercaptan-terminated liquid polysulfide polymer and cures (i.e., oxidizes the mercaptan groups to disulfide linkages) the liquid polysulfide to an elastomer.

EXAMPLES

The following examples are illustrative of the preparation of several representative diaziridinones:

Preparation of di-t-butyldiaziridinone.—N,N'-di-t-butyl-N-chlorourea (7.50 g., 0.0362 mole) was added to a solution of potassium t-butoxide prepared from 1.44 g. (0.0368 g.-atom) of potassium metal and 50 ml. of t-butyl alcohol (distilled from sodium). The flask became warm (60° C.) and the mixture was stirred under a nitrogen atmosphere for 30 min. The mixture was poured into 600 ml. of water and then extracted with five 30 ml. portions of pentane. The pentane extracts were washed with five 200 ml. portions of water, dried (MgSO$_4$) and evaporated to give a clear oil. This was distilled at 30° C. and 0.2 mm. to afford 4.91 g. (80%) of di-t-butyldiaziridinone. The compound possessed a melting point of 0.1° C.; $n_D^{26}$ 1.4267; $d^{29}$ 0.871 g./ml.;

$\nu_{max}^{CCl_4}$ 1926 weak, 188 strong, 1862 strong, and 1800 cm.$^{-1}$ weak; n.m.r., singlet $\tau=8.80$; no maxima in the ultraviolet above 215 m$\mu$; with $\epsilon$ greater than 32. The end absorption shows $\epsilon=1190$ at 215 m$\mu$ (not a maximum). Molecular weight, calculated: 170.3. Found: 178±10 (cryoscopic in clyclohexane).

Analysis.—Calcd. for C$_9$H$_{18}$N$_2$O (percent): C, 63.49; H, 10.66; N, 16.45. Found (percent): C, 63.38; H, 10.74; N, 16.47.

Preparation of di-t-amyldiaziridinone.—This compound was prepared from N,N'-di-t-amyl-N-chlorourea using a method essentially the same as that described above for di-t-butyldiaziridinone: a 73% yield of pure di-t-amyldiaziridinone, B.P. 66.5–67.5°, was obtained with spectral properties: I.R. (CCl$_4$) 1920 sh, 1860 s.—none at 1500–1800 nor at 3200–3600, 1460, 1380, 1365, 1975; n.m.r. (CCl$_4$) 0.98 triplet (6H, J=7.5 c.p.s.), 1.13 singlet (12H), 1.60 quartet (4H, J=7.5 c.p.s.); $n_D^{24.0}=1.440$.

Analysis.—Calcd. for C$_{11}$H$_{22}$N$_2$O (percent): C, 66.62; H, 11.18; N, 14.13. Found (percent): C, 66.78; H, 11.21; N, 14.18.

Preparation of di-t-octyldiaziridinone.—A 1.2 g. (0.0038 mole) sample of the 1-chloro-1,3-di-t-octylurea was added to a solution of potassium t-butoxide in t-butanol (prepared from 0.16 g., 0.0042 mole, potassium and 10 ml. of t-butyl alcohol). With occasional shaking the mixture was allowed to stand for 20 min. Water, 40 ml., was added and the product extracted from the solution with three 15-ml. portions of pentane. The combined pentane extracts were washed with three 20-ml. portions of water and dried (MgSO$_4$). Removal of the pentane and distillation at 80° and 0.02 mm. Hg afforded 0.61 g. or 58% of a viscous, colorless liquid, $n_D^{26.2}$=1.4562; I.R. (CCl$_4$) 1870 s., b, none at 3100–3700, 1470, 1395 w., 1380 m., 1370 m., 1345 w., 1060 m. n.m.r. (CCl$_4$) 1.02 singlet (18H), 1.58 singlet (4H), and at 20.0° a broad doublet centered at 1.20 (12H) with a separation of about 3 c.p.s.; at 30.0° this doublet coalesces to a broad singlet at 1.20 which continues to sharpen with further rise in temperature.

*Analysis.*—Calcd. for C$_{17}$H$_{34}$N$_2$O (percent): C, 72.28; H, 12.13; N, 9.92. Found (percent): C, 72.57; H, 12.18; N, 9.71.

Preparation of bis (1,1-dimethyl-2-phenylethyl)diaziridinone.—This compound was prepared by suspending 20.0 g. (61.7 moles) of powdered 1,3-bis(1,1-dimethyl-2-phenylethyl)urea in a solution of 40 ml. methylene chloride and 50 ml. t-butyl alcohol (distilled from sodium) and adding 8.40 ml. (7.64 g., 82.9 mmoles) t-butyl hypochlorite, covering to avoid light exposure, stirring for 2.5 hrs., and removal of solvent under vacuum. The crude chlorourea was then dissolved in 100 ml. pentane and allowed to stand 20 min. A small amount of crystalline material (presumably unreacted urea) precipitated and was removed by filtration. The pentane was removed and replaced by an equal volume of t-butyl alcohol. The solution was added at once to a stirring solution of potassium t-butoxide in t-butyl alcohol (prepared by dissolving 2.65 g. (67.9 mmoles) potassium) in 100 ml. t-butyl alcohol under a nitrogen atmosphere but blowing in air just before the addition of the chlorourea in an attempt to saturate the solution with oxygen. The mixture was stirred for not longer than 15 sec., and worked up as quickly as possible by pouring the mixture into a mixture of 500 ml. water and 100 ml. pentane. The mixture was extracted with three additional 100-ml. portions of pentane; these were combined with the first and extracted with four 500-ml. portions of water. The pentane solution was dried (K$_2$CO$_3$) and pure diaziridinone was crystallized from it by alternate reduction of solution volume and cooling to −20°. The first fraction was recrystallized from pentane. Four fractions were obtained: 11.97 g. (60.2%) of pure bis(1,1-dimethyl - 2 - phenylethyl)diaziridinone, M.P. 42–43° (analytical sample 43–44°); I.R. (CCl$_4$) 1855 s., b. n.m.r. (CCl$_4$, all singlets) 1.10 (12H), 2.80 (4H), 7.13 (10H).

*Analysis.*—Calcd. for C$_{21}$H$_{26}$N$_2$O (percent): C, 78.22; H, 8.13; N, 8.69. Found (percent): C, 78.30; H, 8.11; N, 8.62.

Preparation of t-butyl-(1,1-dimethyl 2-phenylethyl)diaziridinone.—t-butyl hypochlorite, 2.14 ml. (2.05 g., 19.0 mmol), was added dropwise to a suspension of 4.07 g. (16.4 mmol) of 1-t-butyl-3-(1,1-dimethyl-2-phenylethyl) urea in 20 ml. t-butyl alcohol distilled from sodium metal. The mixture was protected from light and the stirring was continued for 1 hr. To this pale green solution was added all at once a solution of potassium t-butoxide (prepared from 0.843 g. (20.7 mmol) potassium metal and 25 ml. t-butyl alcohol). Stirring was continued for 15 min. and the mixture poured into 300 ml. distilled water. The water mixture was extracted with four 75-ml. portions of pentane. The combined pentane extracts were extracted with four 70-ml. portions of water and dried (K$_2$CO$_3$). The pentane was removed and 10 ml. of fresh pentane was added. On standing white crystals appeared and were filtered. (That they were the starting urea was confirmed by M.P. and n.m.r.) The process was repeated until the formation of the crystals no longer occurred. The product was finally distilled 2.9 g. (72%) B.P. 86–92° (0.02 mm.); $n_D^{24.8}$ 1.4480; n.m.r. (CDCl$_3$) δ 1.12 (singlet, 6H); 1.21 (singlet, 9H), 2.86 (singlet, 2H) and 7.22 (singlet, 5H): IR (CHCl$_3$) 3075 cm.$^{-1}$ (w., Ph).

*Analysis.*—Calcd. for C$_{15}$H$_{22}$N$_2$O (percent): C, 73.12; H, 9.00; N, 11.37. Found (percent): C, 72.85; H, 8.95; N, 11.32.

Preparation of t-octyladamantyl-diaziridinone.—To a suspension of 2.32 g. (7.59 mmoles) of 1-t-octyl-3-adamantylurea in 10 ml. of t-butyl alcohol (distilled from sodium metal) was added, dropwise and with stirring, 1.02 ml. 0.977 g., 9.00 mmoles) of t-butyl hypochlorite. After the addition was complete, all the urea dissolved to give a slightly greenish solution. On further stirring the chlorourea precipitated. It was filtered and then dissolved in pentane. To the pentane solution was added potassium t-butoxide in t-butyl alcohol (prepared from 0.47 g. (12 mmoles) of potassium and 10 ml. of t-butyl alcohol). The mixture was stirred for 10 min. and then poured into 80 ml. of water. The product was extracted from the solution with four 25-ml. portions of pentane. The combined pentane extracts were washed with three 40-ml. portions of water and dried. (K$_2$CO$_3$.) Removal of the pentane yielded 1.16 g. (51% yield) of the diaziridinone, M.P. 42–44°; n.m.r. (CCl$_4$) δ 1.07, 1.20 (singlet, doublet, total H=15), 1.62, 1.72 (singlet, triplet, total H=14) and 2.12 (broad singlet, 3H); IR (CCl$_4$): 2900 cm.$^{-1}$ s, C=O).

*Analysis.*—Calcd. for C$_{19}$H$_{32}$N$_2$O (percent): C, 74.95; H, 10.59; N, 9.20. Found (percent): C, 74.56; H, 10.57; N, 8.97.

I claim:
1. Diaziridinones represented by the formula

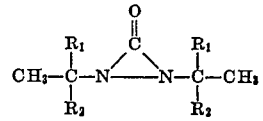

in which R$_1$ represents a lower alkyl group, and R$_2$ represents a substituent selected from the group consisting of phenyl, benzyl, and halogen and lower alkoxy-substituted phenyl and benzyl groups.

2. Diaziridinones having a structure represented by the formula

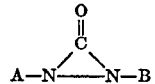

in which A and B each represent a lower-t-alkyl substituent.

3. Diaziridinone according to claim 2 in which A and B are the lower alkyl group of t-butyl.

4. Diaziridinone according to claim 2 in which A and B are the lower alkyl group of t-amyl.

5. Diaziridinone according to claim 2 in which A and B are the lower alkyl group of t-octyl.

References Cited

Greene et al., J. Am. Chem. Soc., vol. 86, p. 3569 (1964). QD1A5.

ALTON D. ROLLINS, Primary Examiner

U.S. Cl. X.R.

260—29.7, 247.2 A, 295 L, 347.3, 348 A, 546, 553 R, 553 A, 558 H, 563 R, 569, 583 B